(12) United States Patent
Scandiffio (10) Patent No.: US 12,266,264 B2
(45) Date of Patent: Apr. 1, 2025

(54) EMERGENCY VEHICLE SAFETY ALERT DEVICES, SYSTEMS, AND METHODS

(71) Applicant: Carlos Alberto Scandiffio, Miami, FL (US)

(72) Inventor: Carlos Alberto Scandiffio, Miami, FL (US)

( * ) Notice: Subject to any disclaimer, the term of this patent is extended or adjusted under 35 U.S.C. 154(b) by 145 days.

(21) Appl. No.: 18/230,436

(22) Filed: Aug. 4, 2023

(65) Prior Publication Data

US 2024/0046788 A1 Feb. 8, 2024

Related U.S. Application Data

(60) Provisional application No. 63/395,514, filed on Aug. 5, 2022.

(51) Int. Cl.
*G08G 1/0965* (2006.01)
*H04W 76/50* (2018.01)

(52) U.S. Cl.
CPC .......... *G08G 1/0965* (2013.01); *H04W 76/50* (2018.02)

(58) Field of Classification Search
CPC ............................ G08G 1/0965; H04W 76/50
See application file for complete search history.

(56) References Cited

U.S. PATENT DOCUMENTS

| | | | |
|---|---|---|---|
| 10,304,341 B1 | 5/2019 | Crasso et al. | |
| 2003/0191577 A1 | 10/2003 | Decaux | |
| 2005/0134440 A1 | 6/2005 | Breed | |
| 2005/0231385 A1* | 10/2005 | Haase | G06Q 30/0267 |
| | | | 705/14.62 |
| 2007/0188312 A1 | 8/2007 | Bihler et al. | |
| 2019/0073695 A1 | 3/2019 | Wasserman et al. | |

FOREIGN PATENT DOCUMENTS

DE 102009038570 B3 2/2011

* cited by examiner

*Primary Examiner* — Nabil H Syed
*Assistant Examiner* — Cal J Eustaquio
(74) *Attorney, Agent, or Firm* — Rouget F. Henschel; Brian J. Hairston; Potomac Law Group, PLLC (57) ABSTRACT

An emergency vehicle safety alert system helps motorists, cyclists, and pedestrians become aware of the presence of an emergency vehicle on a road and a direction from which the emergency vehicle is approaching. The emergency vehicle safety alert system includes: a remote transmitter configured to be disposed in a vehicle and to transmit a first signal; a transceiver configured to receive the first signal, in response to the vehicle being disposed within a predetermined distance from the transceiver, and to transmit a second signal, in response to receipt of the first signal; and a receiver configured for operative connection with the display and to receive the second signal to cause the display to exhibit alert information thereon. Based on receipt of the first signal by the transceiver, the alert information indicates the presence of the emergency vehicle and the direction from which the emergency vehicle is approaching.

17 Claims, 4 Drawing Sheets

EMERGENCY VEHICLE SAFETY ALERT
DEVICES, SYSTEMS, AND METHODS

CROSS-REFERENCE TO RELATED APPLICATION(S)

This application claims the benefit under 35 U.S.C. § 119(e) of U.S. Provisional Application No. 63/395,514 filed on Aug. 5, 2022, the entire disclosure of which is incorporated herein by reference for all purposes.

FIELD OF THE DISCLOSURE

Disclosed embodiments relate to warning devices, systems, and methods, and more specifically, to such devices, systems, and methods enabling delivery of an alert as to the presence of emergency vehicles which may be visualized by motorists, cyclists, and pedestrians in a vicinity of the alert.

BACKGROUND

Accidents involving emergency vehicles, such as fire trucks, ambulances, and police cars, are a substantial problem in the United States. Vehicle fatality rates for emergency responders are estimated to be up to 4.8 times higher than the national average. Because emergency vehicles are traveling at higher speeds to reach crisis situations, accidents often result in severe injury or death.

The National Highway Traffic Safety Administration (NHTSA) released a report that provided an overview of the number of ambulance accidents in the United States. (one.nhtsa.gov/nhtsa/whatis/planning/2020Report/2020report.html) The NHTSA studied the number of ambulance accidents over a 20 year period. (one.nhtsa.gov/Data/EMS-Data) North-Western National also conducted a recent study of 466 ambulance accidents. Below are some of the key findings from both reports:

There are an estimated 6,500 accidents involving ambulances each year.
35% of crashes resulted in injury or fatality to at least 1 occupant of a vehicle involved.
When injuries occur, there are, on average, three unique injuries per accident.
On average, 29 fatal ambulance accidents produce 33 fatalities each year.
On average, 2,600 people are injured in 1,500 ambulance accidents each year.
Of those killed in an ambulance accident, 63% were occupants of a passenger vehicle, 21% were passengers in the ambulance, 4% were the ambulance drivers, and 12% were non-occupants.
Nearly 60% of ambulance accidents occur during the course of emergency use.
Emergency medical personnel are at a higher risk of crashing when compared to other first responders.

According to data from the NHTSA and the United States Fire Administration (USFA), firetruck accidents are the second leading cause of on-the-job deaths for firefighters. (www.workzonebarriers.com/emergency-response-firetruck-collision-crash-facts.html) Below are some key findings from an analysis of NHTSA data on firetruck accidents from 2000-2009:

Over that 10-year period, there were roughly 31,600 accidents involving fire vehicles.
49 of those accidents resulted in at least 1 fatality to an occupant of the firetruck.
About 70% of all firetruck accidents occurred while in emergency use.
Rollovers accounted for 66% of all fatal firetruck accidents.

As seen in the statistics, firetruck accidents can be severe, often resulting in serious injuries or even fatalities. Since firetrucks, like emergency ambulances, are frequently responding to emergency situations, most of the accidents occurred in such settings.

On average, a person is killed in a pursuit-related crash every day. University of Washington researchers performed an analysis of the number of fatalities each year that occur during police pursuits. Below are some of their key findings:

Each year, there are approximately 300 fatalities in the U.S. that occur during police pursuits.
Just over 30% of the fatalities occurred to people who were not involved in the pursuit.
Police officers have roughly double the rate of motor vehicle crashes per million vehicles driven as the general public.

Often, there exists a lack of warning as to the presence of emergency vehicles on routes traversed by motorists, cyclists, and pedestrians. Such lack of warning is an inherent danger to drivers of emergency vehicles and to other individuals, such as motorists, cyclists, and pedestrians, who may need to exercise caution to in the presence of such emergency vehicles. Accordingly, such lack of warning can contribute to the number and severity of accidents involving emergency vehicles.

SUMMARY

It is to be understood that both the following summary and the detailed description are exemplary and explanatory and are intended to provide further explanation of the present embodiments as claimed. Neither the summary nor the description that follows is intended to define or limit the scope of the present embodiments to the particular features mentioned in the summary or in the description. Rather, the scope of the present embodiments is defined by the appended claims.

The devices, systems, and methods disclosed herein are provided as means to protect motorists, cyclists, and pedestrians (collectively referred to as "traffic"), by way of alerting traffic about the presence of emergency vehicles nearby. According to some embodiments, a safety alert system includes a remote transmitter mounted on or in an emergency vehicle and configured to send a first signal to a transceiver installed on or adjacent to a roadway as the emergency vehicle approaches the transceiver. In response to receiving the first signal, the transceiver sends a second signal to a display disposed at or near a traffic intersection, through a receiver operatively connected to the display. The display exhibits warning information indicating a presence and a travel direction of the vehicle, based the second signal. Multiple transceivers and displays can be provided to correspond to an intersection, depending on a number of travel directions of traffic at the intersection.

According to one or more embodiments, a safety alert system for causing information to be exhibited on a display can include: a remote transmitter configured to be disposed in a vehicle and to transmit a first signal; a transceiver configured to receive the first signal, in response to the vehicle being disposed within a predetermined distance from the transceiver, and to transmit a second signal, in response to receipt of the first signal; and a receiver configured for operative connection with the display and to receive the second signal to cause the display to exhibit the information thereon. Based on receipt of the first signal by the transceiver, the information can indicate a presence of the vehicle and a travel direction of the vehicle.

According to one or more embodiments, the transceiver can be configured to be disposed on or adjacent to a roadway at a predetermined distance from the display.

According to one or more embodiments, the receiver can be configured to be disposed adjacent to the display.

According to one or more embodiments, the system can further include the display, and the display is configured to be mounted on a traffic light structure.

According to one or more embodiments, the information can include a directional light pattern.

According to one or more embodiments, the vehicle can be any one of an ambulance, a fire truck, a police vehicle, and a rescue vehicle.

According to one or more embodiments, a magnitude of the second signal can be greater than a magnitude of the first signal.

According to one or more embodiments, the receiver can be further configured for operative connection with an additional display and to receive the second signal to cause the additional display to exhibit additional information thereon. Based on receipt of the first signal by the transceiver, the additional information can indicate the presence of the vehicle and the travel direction of the vehicle.

According to one or more embodiments, the system can further include the display and the additional display. The display can be configured to exhibit the information toward traffic approaching along a path. The additional display can be configured to exhibit the additional information toward traffic approaching along another path.

According to one or more embodiments, the information can include a directional light pattern, and the additional information can include an additional directional light pattern that is different from the directional light pattern.

According to one or more embodiments, the system can further include: an additional transceiver configured to receive the first signal, in response to the vehicle being disposed within a predetermined distance from the additional transceiver, and to transmit an additional second signal, in response to receipt of the first signal. The receiver can be further configured for operative connection with an additional display and to receive the additional second signal to cause an additional display to exhibit additional information thereon. Based on receipt of the first signal by the additional transceiver, the additional information can indicate the presence of the vehicle and an additional travel direction of the vehicle.

According to one or more embodiments, the transceiver can be configured to be disposed at a predetermined distance from the display in a one direction, and the additional transceiver can be configured to be disposed at a predetermined distance from the additional display in another direction different from the one direction.

According to one or more embodiments, the system can further include the display and the additional display. The display can be configured to exhibit the information toward traffic approaching along a path. The additional display can be configured to exhibit the additional information toward the traffic approaching along the path.

According to one or more embodiments, the information can include a directional light pattern and the additional information can include an additional directional light pattern that is different from the directional light pattern.

According to one or more embodiments, a method for causing information to be exhibited on a display in a traffic safety system can include: receiving, by a transceiver, a first signal remotely transmitted by a vehicle disposed within a predetermined distance from the transceiver; in response to the transceiver receiving the first signal, transmitting, by the transceiver, a second signal to a receiver; and in response to the receiver receiving the second signal, exhibiting the information on a display operatively connected to the receiver. Based on the first signal being received by the transceiver, the information can indicate a presence of the vehicle and a travel direction of the vehicle.

According to one or more embodiments, the information can include a directional light pattern.

According to one or more embodiments, the vehicle can be any one of an ambulance, a fire truck, a police vehicle, and a rescue vehicle.

Other features and aspects will be apparent from the following detailed description, the drawings, and the claims.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. Embodiments herein will be more particularly described in conjunction with the following drawings wherein.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
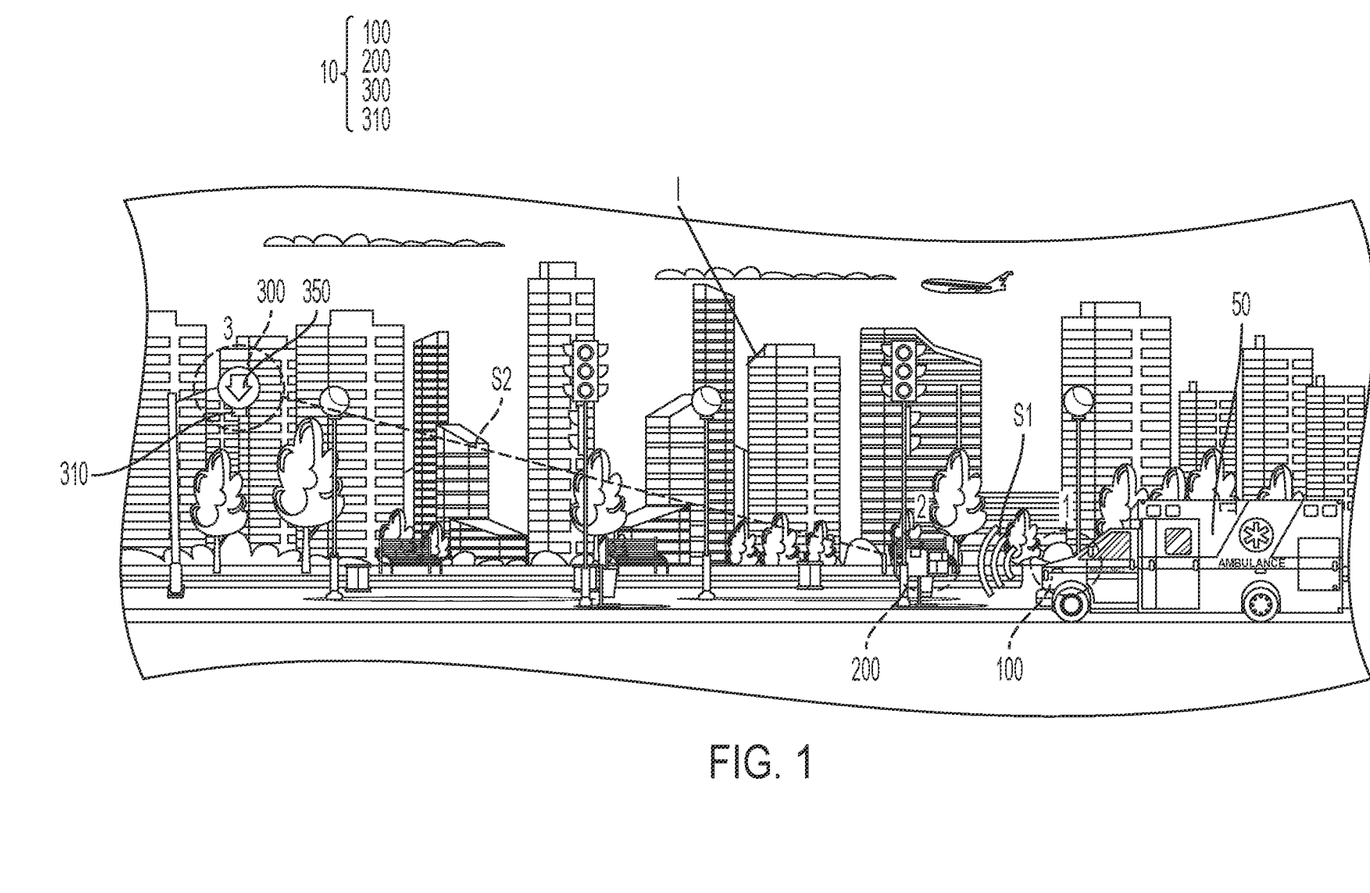
FIG. 1 illustrates a perspective view of an emergency vehicle safety alert system, according to one or more embodiments herein.

FIG. 1 illustrates a perspective view of an emergency vehicle safety alert system 10 (hereinafter, "safety alert system"), according to one or more embodiments. Referring to FIG. 1, the safety alert system 10 includes a remote transmitter 100, a transceiver 200, and one or more displays 300.

Figure 2:
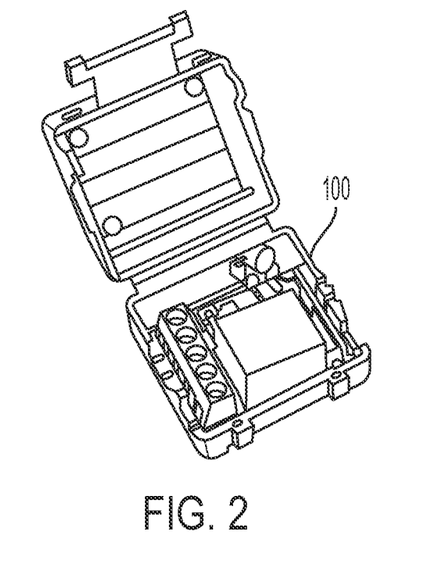
FIG. 2 illustrates a remote transmitter of the emergency vehicle safety alert system that is configured to be mounted on or in an emergency vehicle, according to one or more embodiments herein.

FIG. 2 illustrates the remote transmitter 100, according to one or more embodiments. The remote transmitter 100 is a wireless transmitting sensor that is mounted in or on an emergency vehicle 50. For example, the remote transmitter 100 can be hardwired into the emergency vehicle 50. As shown in FIG. 1, the remote transmitter 100 can be a simple transmitter that wirelessly emits a first signal S1 having a unique frequency. For example, the remote transmitter 100 can wirelessly emit the first signal S1 at a distance of about 100-150 feet from the transceiver 200. In some embodiments, the unique frequency can indicate a type (e.g., ambulance, fire truck, or police car) of the emergency vehicle 50.

In some embodiments, the first signal S1 can be a radio frequency (RF) signal. For example, the first signal S1 can be in the 2.4 GHz frequency band. However, the first signal S1 is not limited to a particular frequency band.

Figure 3:
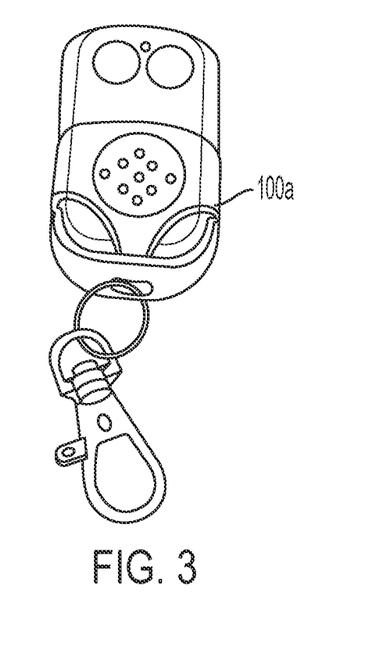
FIG. 3 illustrates a portable remote transmitter of the emergency vehicle safety alert system, according to one or more embodiments herein.

FIG. 3 illustrates a portable remote transmitter 100a, according to one or more additional embodiments. The portable remote transmitter 100a can be used in place of or as a back-up device to the remote transmitter 100. Instead of being mounted in or on the emergency vehicle 50, the portable remote transmitter 100a can be completely wireless and is not permanently attached to the emergency vehicle 50. The portable remote transmitter 100a can be carried by a driver or other personnel associated with the emergency vehicle 50, or stored in an interior space of the emergency vehicle 50.

Figure 4:
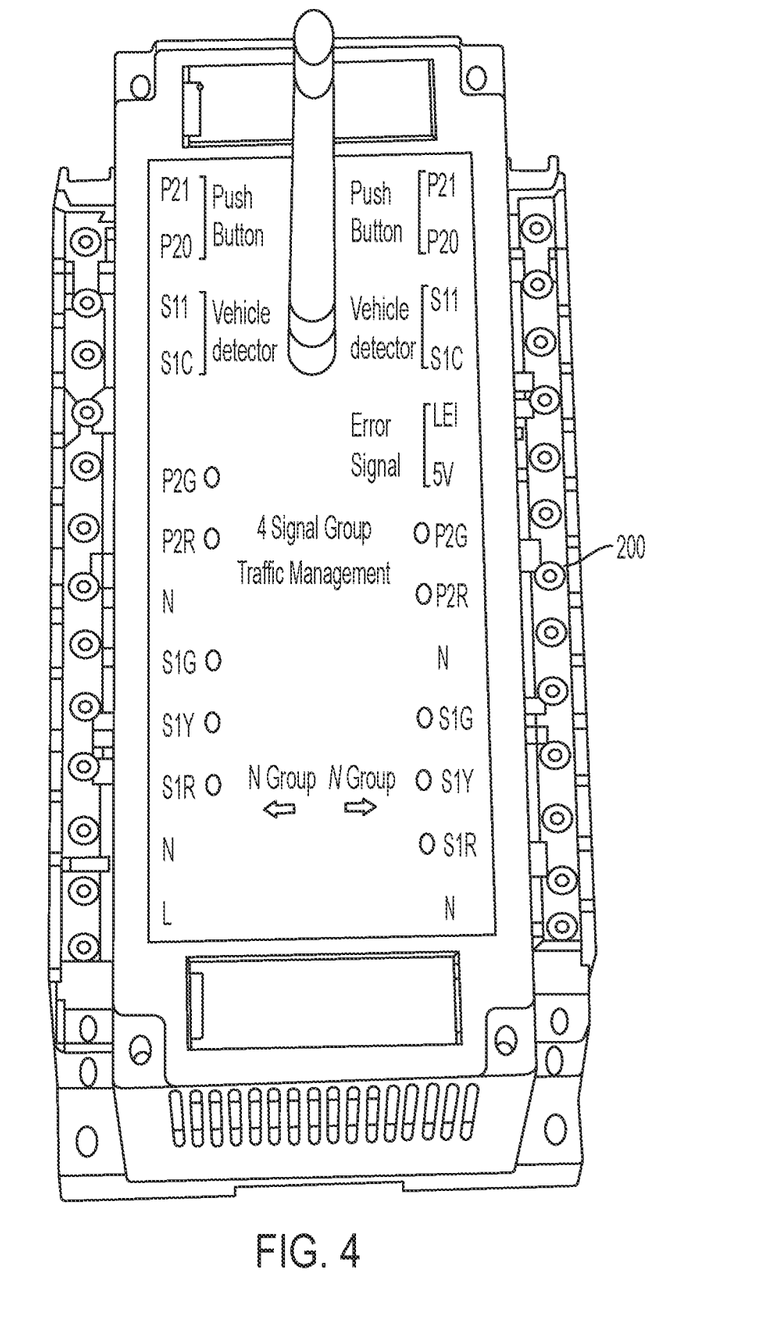
FIG. 4 illustrates a transceiver of the emergency vehicle safety alert system that is configured to be mounted on or adjacent to a roadway, according to one or more embodiments herein.

FIG. 4 illustrates the transceiver 200, according to one or more embodiments. The transceiver 200 is a fixed electronic controller box. As illustrated in FIG. 1, the transceiver 200 can be installed along or near a roadway R leading to an intersection I, at a predetermined distance from the one or more displays 300. The transceiver 200 can be mounted on a traffic light pole, or can be mounted on a dedicated pole or other structure. In some implementations, the transceiver 200 can be streamlined and coupled to a traffic signal box to minimize structural design and construction. The transceiver 200 can be wired to local electrical power sources or fitted with solar cells to receive solar power.

Referring to FIG. 1, the transceiver 200 is configured to receive and process the first signal S1, and is configured to transmit a second signal S2 to a receiver 310 of the one or more displays 300 based on the first signal S1. The second signal S2 can have a magnitude that is greater than a magnitude of the first signal S1. The second signal S2 can be transmitted wirelessly or through a wired connection, depending on the site, structures, height, and unobstructed areas, in order to suit each direction from which traffic approaches the intersection I (e.g., left, right, in front, or behind). Thus, according to one or more embodiments, the second signal S2 is encoded with directional information that indicates an approach direction of the emergency vehicle 50 in which the remote transmitter 100 or portable remote transmitter 100a emitting the first signal S1 is disposed. Additionally, according to one or more embodiments, the second signal S2 can be encoded with vehicle type information that indicates the type (e.g., ambulance, fire truck, or police car) of the emergency vehicle 50, based on the unique frequency of the first signal S1.

In some embodiments, the second signal S2 can be an RF signal. For example, the second signal S2 can be in the 2.4 GHz frequency band. However, the second signal S2 is not limited to a particular frequency band.

Referring back to FIG. 4, the transceiver 200 controls the one or more displays 300. For example, the transceiver 200 can be configured as a four-way, three-way, or two-way controller, depending on the type of traffic pattern at the intersection I. The transceiver 200 can be configured as a master controller that controls the receiver 310, which is operatively connected to the one or more displays 300. In some embodiments, the transceiver 200 can support 8-signal group traffic management (e.g., 4 vehicle signal groups, and 4 pedestrian signal groups).

In some embodiments, the transceiver 200 can include wireless sensors for receiving the first signal S1 from the remote transmitter 100 or portable remote transmitter 100a, and transmitting the second signal S2 to the receiver 310. In some embodiments, the transceiver 200 can include wireless sensors for receiving the first signal S1 from the remote transmitter 100 or portable remote transmitter 100a, and can include wired sensors for transmitting the second signal S2 to the receiver 310.

Figure 5:
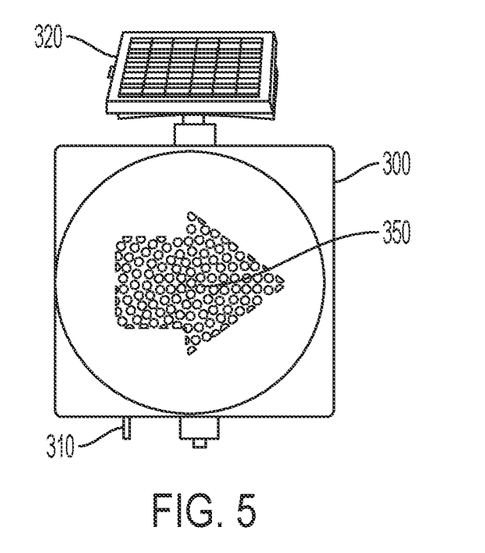
FIG. 5 illustrates a display of the emergency vehicle safety alert system, according to one or more embodiments herein.

FIG. 5 illustrates the display 300, according to one or more embodiments. The display 300 is a multi-directional traffic light that is operable to exhibit alert information 350 based on receipt of the second signal S2 by the receiver 310. The display 300 can be powered by a power source connected the display 300 by a wired connection, or can be powered by a solar power cell unit 320.

As shown in FIG. 5, the receiver 310 is operatively connected to the display 310 and can be mounted on or in the display 300. However, in some embodiments, the receiver 310 can be separately provided and operatively connected to the display 300. The receiver 310 can be configured as a slave controller operating based on the signal S2 being transmitted by the transceiver 200. More specifically, the receiver 310 can cause or control the display 300 to exhibit the alert information 350 in response to receiving the second signal S2.

The alert information 350 indicates a presence of the emergency vehicle 50 and a travel direction of the emergency vehicle 50. For example, the alert information 350 can include a non-intrusive or non-infringing directional light pattern, such as a bright, arrow-shaped light pattern that points in a direction corresponding to the direction from which the emergency vehicle 50 approaches the intersection I. The alert information 350 can vary corresponding to different alert functions. For example, in some embodiments, a color and/or blinking sequence of the arrow-shaped light pattern can correspond to the type of the emergency vehicle 50 indicated by the second signal S2.

As one non-limiting example, the display 300 can be controlled based on the signal S2 to exhibit the alert information 350 to indicate the presence and direction of the emergency vehicle 50, as provided in Table 1 below.

TABLE 1

Example Alert Information

| Alert Information | Indication |
| --- | --- |
| Blinking arrow left | Emergency vehicle is coming from the motorist's, cyclist's, or pedestrian's left and should arrive at the intersection within two minutes. |
| Blinking arrow right | Emergency vehicle is coming from the motorist's, cyclist's, or pedestrian's right and should arrive at the intersection within two minutes. |
| Blinking arrow up | Emergency vehicle is coming from ahead of the motorist, cyclist, or pedestrian and should arrive at the intersection within two minutes. |
| Blinking arrow down | Emergency vehicle is coming from behind the motorist, cyclist, or pedestrian and should arrive at the intersection within two minutes. |

As indicated above, one or more displays 300 can be provided at or near the intersection I. The number, installation, and configuration of the one or more displays 300 will depend on a configuration (e.g., four-way, three-way (T), two-way, or entry/exit ramps) of the intersection I. As illustrated in FIGS. 1 and 5, each of the one or more displays 300 can be configured as a stand-alone unit that is mounted on an independent pole (e.g., a rigid pole above traffic or a rigid pole at each side of a street) or other mounting structure (e.g., a hanging cable). For example, each of the one or more displays 300 can be mounted to exhibit the alert information 350 toward traffic approaching the intersection I along a path in a respective direction.

Figure 6:
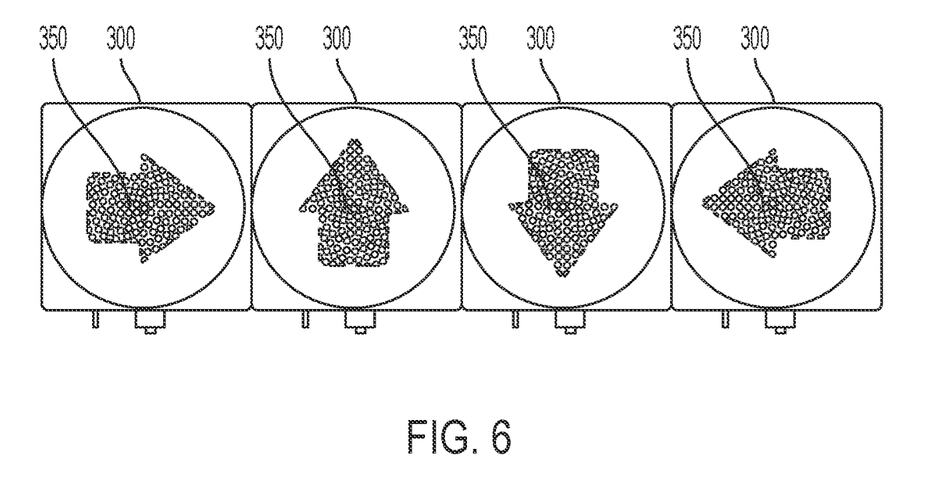
FIG. 6 illustrates a plurality of displays of the emergency vehicle safety alert system, according to one or more embodiments herein.

Alternatively, as illustrated in FIG. 6, a plurality of displays 300 can be assembled as one unit that is mounted on an independent pole or other mounting structure. For example, in some embodiments, since different types of emergency vehicles 50 can potentially enter an intersection from different directions, a string of multiple (e.g., 4) displays 300 assembled as one unit can be installed on an independent pole or other mounting structure. Each display 300 of the unit can be configured to exhibit respective alert information 350 to traffic approaching the intersection along a path in a same direction. Thus, in the case of a first emergency vehicle 50, such as an ambulance, approaching a four-way intersection from the right and a second emergency vehicle 50, such as a fire truck, approaching the four-way intersection from the left, the transceiver 200 would transmit the appropriate directional information in respective second signals S2 for corresponding displays 300 to indicate the first and second emergency vehicles 50 approaching the four-way intersection.

In some embodiments in which multiple displays 300 are provided for an intersection, a respective receiver 310 can be included in or operatively connected to each display 300. Alternatively, in other embodiments in which multiple displays 300 are provided for the intersection, one receiver 310 can be provided for each display 300, or one receiver 310 can be provided for each group among groups of the displays 300.

In some embodiments, one transceiver 200 can be configured to receive a first signal S1 from a remote transmitter 100 or portable remote transmitter 100a in an emergency vehicle 50 approaching an intersection from any direction among the approach directions from which traffic can approach the intersection. In such embodiments, the one transceiver 200 can be configured to control multiple displays 300 that are configured to respectively exhibit alert information 350 toward traffic approaching the intersection in the approach directions, by transmitting respective second signals S2 to receivers 310 corresponding to the multiple displays 300.

Alternatively, in some embodiments, multiple transceivers 200 can be provided in one-to-one correspondence with a number of approach directions from which traffic can approach the intersection, and each transceiver 200 can be configured to receive a first signal S1 from a remote transmitter 100 or portable remote transmitter 100a in an emergency vehicle 50 approaching an intersection from a corresponding one of the approach directions. In such embodiments, each transceiver 200 can control multiple displays 300 that are configured to respectively exhibit alert information 350 toward traffic approaching the intersection in respective approach directions, by transmitting respective second signals S2 to receivers 310 of the displays 300.

An example operation of the safety alert system 10 will now be described with reference to FIG. 1. As shown in FIG. 1, when the emergency vehicle 50 approaches the transceiver 200 and is within a predetermined distance from the transceiver 200, the remote transmitter 100 or portable remote transmitter 100a transmits the first signal S1. In response to receiving the first signal S1, the transceiver 200 transmits the second signal S2 to the receiver 310. In response to the receiver 310 receiving the second signal S2, the one or more displays 300 exhibit respective alert information 350 indicating the presence of the emergency vehicle 50 and the approach direction from which the emergency vehicle 50 approaches the intersection I.

Although the safety alert system 10 is described herein as being implemented with emergency vehicles, the safety alert system 10 can also be implemented with vehicles other than emergency vehicles.

According to the National Transportation Safety Board, the vast majority of fatal accidents were labeled as "preventable," due to being a matter of awareness on the part of motorists, cyclists, or pedestrians. The mortality rate of such accidents defies programs, paths, signage, and ordinary warnings. The safety alert systems and methods of operating such systems described herein are directed to addressing this problem by enabling motorists, cyclists, and pedestrians to easily become aware of and quickly respond to a situation involving an oncoming emergency vehicle. More specifically, the embodiments disclosed herein are designed to take advantage of processing characteristics of the anterior cingulate cortex (ACC) of the human brain, which works at a subconscious level to help a person recognize and, hopefully, avoid high-risk situations.

More specifically, in spite of peripheral activity, when a high-risk situation occurs, the ACC triggers a warning, based on memory recall, indicating that something is about to happen, triggers a first signal instructing the person to take responsive action, and then triggers one or more additional signals causing specific responsive actions. For example, in a situation in which an emergency vehicle is approaching a motorist at an intersection, the motorist's brain could trigger a second signal causing the motorist to lift his or her foot from an accelerator pedal of the motorist's vehicle, or reduce pressure applied to the accelerator, and could then trigger a third signal causing the motorist to apply brakes of the motorist's vehicle.

The embodiments disclosed herein take advantage of AAC processing characteristics by employing a display configured to exhibit a bright, distinctive light pattern that can quickly indicate a high-risk situation and draw the attention of motorists, cyclists, and pedestrians to thereby enable the motorists, cyclists, and pedestrians to react to the information conveyed by the light pattern. More specifically, the disclosed embodiments enhance situational awareness of motorists, cyclists, and pedestrians, and as a result:

1) Avoid confusion of motorists, cyclists, and pedestrians in determining a direction from which an emergency vehicle and associated noise are approaching;
2) Avoid hesitation of motorists, cyclists, and pedestrians in moving traffic patterns out of the way to let emergency vehicles transit freely;
3) Avoid unnecessary and dangerous rapid maneuvers to create necessary transit space for emergency vehicles;
4) Raise collective directional awareness of motorists, cyclists, and pedestrians;
5) Eliminate obstruction of busy intersections by coaching traffic patterns instantly and enabling a "second-nature" maneuver.

Reference in this specification to "embodiments" (e.g., "some embodiments," "various embodiments," "one embodiment," "an embodiment," etc.) means that a particular feature, structure, or characteristic described in connection with the embodiment is included in at least one embodiment of the disclosure. The appearances of these phrases in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "includes" and "has" specify the presence of stated features, numbers, operations, members, elements, and/or combinations thereof, but do not preclude the presence or addition of one or more other features, numbers, operations, members, elements, and/or combinations thereof.

The remote transmitter 100, the portable remote transmitter 100a, the transceiver 200, and the receiver 310 in FIGS. 1 to 6 that perform the operations described in this application are implemented by hardware components configured to perform the operations described in this application. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 to 6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMS, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A safety alert system for causing information to be exhibited on a display, the system comprising:
   a remote transmitter configured to be disposed in a vehicle and to transmit a first signal;
   a transceiver configured to receive the first signal, in response to the vehicle being disposed within a predetermined distance from the transceiver, and to transmit a second signal, in response to receipt of the first signal; and
   a receiver configured for operative connection with the display and to receive the second signal to cause the display to exhibit the information thereon,
   wherein, based on receipt of the first signal by the transceiver, the information indicates a presence of the vehicle and a travel direction of the vehicle.

2. The system of claim 1, wherein the transceiver is configured to be disposed on or adjacent to a roadway at a predetermined distance from the display.

3. The system of claim 2, wherein the receiver is configured to be disposed adjacent to the display.

4. The system of claim 1, wherein:
   the system further comprises the display, and
   the display is configured to be mounted on a traffic light structure.

5. The system of claim 1, wherein the information includes a directional light pattern.

6. The system of claim 1, wherein the vehicle is any one of an ambulance, a fire truck, a police vehicle, and a rescue vehicle.

7. The system of claim 1, wherein a magnitude of the second signal is greater than a magnitude of the first signal.

8. The system of claim 1, wherein:
   the receiver is further configured for operative connection with an additional display and to receive the second signal to cause the additional display to exhibit additional information thereon, and
   based on receipt of the first signal by the transceiver, the additional information indicates the presence of the vehicle and the travel direction of the vehicle.

9. The system of claim 8, further comprising:
   the display and the additional display,
   wherein the display is configured to exhibit the information toward traffic approaching along a path, and
   wherein the additional display is configured to exhibit the additional information toward traffic approaching along another path.

10. The system of claim 8, wherein:
    the information includes a directional light pattern, and
    the additional information includes an additional directional light pattern that is different from the directional light pattern.

11. The system of claim 1, further comprising:
    an additional transceiver configured to receive the first signal, in response to the vehicle being disposed within a predetermined distance from the additional transceiver, and to transmit an additional second signal, in response to receipt of the first signal,
    wherein the receiver is further configured for operative connection with an additional display and to receive the additional second signal to cause an additional display to exhibit additional information thereon, and
    wherein, based on receipt of the first signal by the additional transceiver, the additional information indicates the presence of the vehicle and an additional travel direction of the vehicle.

12. The system of claim 11, wherein:
the transceiver is configured to be disposed at a predetermined distance from the display in a one direction, and
the additional transceiver is configured to be disposed at a predetermined distance from the additional display in another direction different from the one direction.

13. The system of claim 12, further comprising:
the display and the additional display,
wherein the display is configured to exhibit the information toward traffic approaching along a path, and
wherein the additional display is configured to exhibit the additional information toward the traffic approaching along the path.

14. The system of claim 13, wherein:
the information includes a directional light pattern, and
the additional information includes an additional directional light pattern that is different from the directional light pattern.

15. A method for causing information to be exhibited on a display in a traffic safety system, the method comprising:
receiving, by a transceiver, a first signal remotely transmitted by a vehicle disposed within a predetermined distance from the transceiver;
in response to the transceiver receiving the first signal, transmitting, by the transceiver, a second signal to a receiver; and
in response to the receiver receiving the second signal, exhibiting the information on a display operatively connected to the receiver,
wherein, based on the first signal being received by the transceiver, the information indicates a presence of the vehicle and a travel direction of the vehicle.

16. The method of claim 15, wherein the information includes a directional light pattern.

17. The method of claim 15, wherein the vehicle is any one of an ambulance, a fire truck, a police vehicle, and a rescue vehicle.

* * * * *